(12) United States Patent
Suzuki

(10) Patent No.: US 10,210,176 B2
(45) Date of Patent: Feb. 19, 2019

(54) INFORMATION PROVISION SYSTEM

(71) Applicant: DENSO CORPORATION, Kariya, Aichi-pref. (JP)

(72) Inventor: Takamitsu Suzuki, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 421 days.

(21) Appl. No.: 14/388,178

(22) PCT Filed: Mar. 20, 2013

(86) PCT No.: PCT/JP2013/001888
§ 371 (c)(1),
(2) Date: Sep. 25, 2014

(87) PCT Pub. No.: WO2013/145643
PCT Pub. Date: Oct. 3, 2013

(65) Prior Publication Data
US 2015/0052131 A1 Feb. 19, 2015

(30) Foreign Application Priority Data

Mar. 28, 2012 (JP) ................. 2012-073845

(51) Int. Cl.
*G06F 17/30* (2006.01)
*H04L 29/08* (2006.01)
(Continued)

(52) U.S. Cl.
CPC . *G06F 17/30241* (2013.01); *G08G 1/096716* (2013.01); *G08G 1/096741* (2013.01);
(Continued)

(58) Field of Classification Search
CPC ........ G06F 17/30241; G08G 1/096716; G08G 1/096741; G08G 1/096775; G08G 1/20; H04L 67/12; H04L 67/18; G01C 21/3691
(Continued)

(56) References Cited

U.S. PATENT DOCUMENTS 6,338,020 B2   1/2002  Hashimoto
7,203,597 B2   4/2007  Sato et al.
(Continued)

FOREIGN PATENT DOCUMENTS

JP    H11153953 A    6/1999
JP    2001197564 A   7/2001
(Continued)

OTHER PUBLICATIONS

Office Action dated Jan. 12, 2016 issued in the corresponding JP application No. 2012-73845 in Japanese with English translation.
(Continued)

*Primary Examiner* — Ashish Thomas
*Assistant Examiner* — Dustin D Eyers
(74) *Attorney, Agent, or Firm* — Harness, Dickey & Pierce, P.L.C.

(57) ABSTRACT

An information provision system includes: a vehicular mobile terminal; and a server that accesses a registration database and provides a content to the vehicular mobile terminal. The registration database registers a position-interrelated content provision web page that: specifies the content to be provided according to an input condition; and defines a position-interrelated content to be provided when the vehicular mobile terminal satisfies a trigger condition. The system further includes: a position-interrelated content search device that searches for the position-interrelated content corresponding to a same trigger condition as a moving state of the vehicular mobile terminal when the
(Continued)

vehicular mobile terminal accesses the position-interrelated content provision web page and the position-interrelated content provision web page defines the position-interrelated content for the vehicular mobile terminal; and an information provision device that provides a user of the vehicular mobile terminal with a searched position-interrelated content when the trigger condition is satisfied.

14 Claims, 6 Drawing Sheets

(51) Int. Cl.
*G08G 1/0967* (2006.01)
*G08G 1/00* (2006.01)
*G01C 21/36* (2006.01)

(52) U.S. Cl.
CPC ......... *G08G 1/096775* (2013.01); *G08G 1/20* (2013.01); *H04L 67/12* (2013.01); *H04L 67/18* (2013.01); *G01C 21/3691* (2013.01)

(58) Field of Classification Search
USPC ........................................................ 707/736
See application file for complete search history.

(56) References Cited

U.S. PATENT DOCUMENTS

| | | |
|---|---|---|
| 2004/0203630 A1 | 10/2004 | Wang |
| 2006/0223494 A1 | 10/2006 | Chmaytelli et al. |
| 2007/0055660 A1* | 3/2007 | Anderson ............... H04L 67/06 |
| 2008/0114539 A1 | 5/2008 | Lim |
| 2010/0205060 A1* | 8/2010 | Athsani .............. G01C 21/3484 |
| | | 705/14.58 |
| 2012/0072869 A1* | 3/2012 | Odagawa .............. G06F 3/0482 |
| | | 715/810 |

FOREIGN PATENT DOCUMENTS

| | | |
|---|---|---|
| JP | 2002048567 A | 2/2002 |
| JP | 2002116032 A | 4/2002 |
| JP | 2004282610 A | 10/2004 |
| JP | 2004341835 A | 12/2004 |
| JP | 2005521299 A | 7/2005 |
| JP | 2008125087 A | 5/2008 |
| JP | 2008537822 A | 9/2008 |
| JP | 2008293102 A | 12/2008 |
| JP | 2009003897 A | 1/2009 |
| JP | 2010061616 A | 3/2010 |
| WO | WO-2003038377 A1 | 5/2003 |

OTHER PUBLICATIONS

Hirokawa, Yukio, "Middleware Technology That Supports Telematics," Fujitsu, vol. 5, No. 4, pp. 300-303, Jul. 2004.

Office Action dated May 26, 2015 in corresponding Japanese Application No. 2012-073845.

International Search Report and Written Opinion (in Japanese with English Translation) for PCT/JP2013/001888, dated May 7, 2013; ISA/JP.

* cited by examiner

FIG. 2

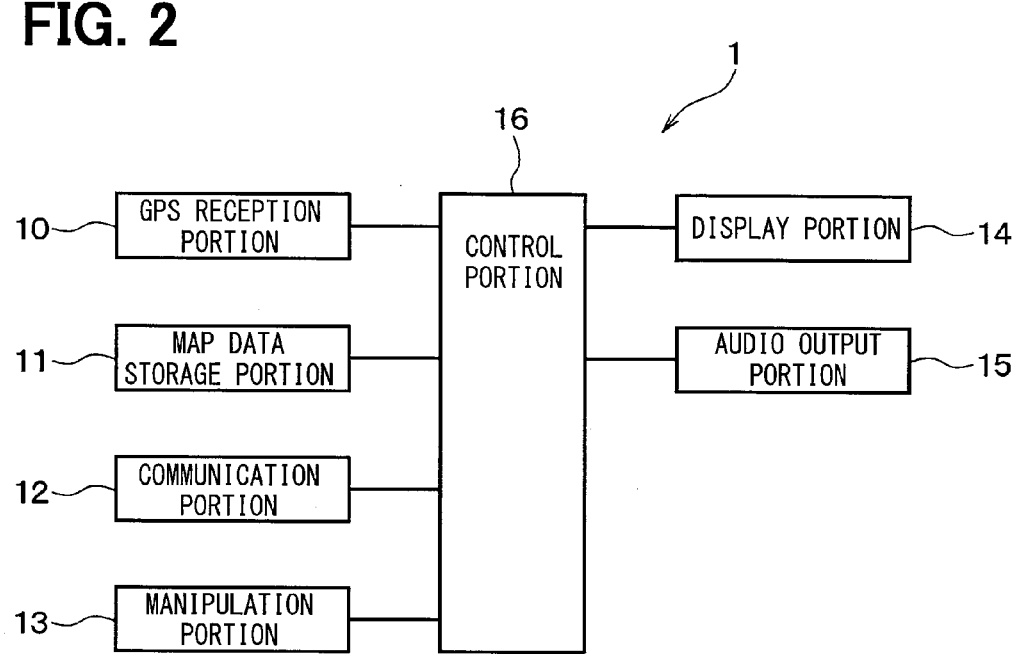

FIG. 3

| TRIGGER CONDITION | CONDITION IMAGE | DESCRIPTION |
|---|---|---|
| link−to−link | ↗ | TO PROVIDE INFORMATION FOR ONLY A MOBILE BODY THAT TRAVELS A ROUTE FROM ONE LINK TO ANOTHER. POSSIBLE TO SPECIFY A TIMING TO PROVIDE INFORMATION. |
| link−to−point | ○↗ | TO PROVIDE INFORMATION FOR ONLY A MOBILE BODY THAT PASSES THROUGH A GIVEN LINK AND APPROACHES A GIVEN POINT. POSSIBLE TO SPECIFY A TIMING TO PROVIDE INFORMATION. |
| link−to−area | ☁ | TO PROVIDE INFORMATION FOR ONLY A MOBILE BODY THAT ENTERS (OR EXITS) TO A GIVEN AREA. POSSIBLE TO SPECIFY A TIMING TO PROVIDE INFORMATION. |

FIG. 4

| | POSITION-INTERRELATED HTML REGISTRATION SERVER | SP SERVER OR CP SERVER | REFERENCED SP SERVER OR REFERENCED CP SERVER |
|---|---|---|---|
| (1) CASE TO REGISTER ALL DATA IN POSITION-INTERRELATED HTML REGISTRATION SERVER | \<header\> POSITION-INTERRELATED CONDITION META DEFINITION \</header\> \<body\> ACTUAL DATA \</body\> | | |
| (2) CASE TO SPECIFY A REGISTRATION DESTINATION URL TO POSITION-INTERRELATED HTML REGISTRATION SERVER. | \<header\> POSITION-INTERRELATED CONDITION META DEFINITION \</header\> \<body\> URL ADDRESS \</body\> | \<header\> ... \</header\> \<body\> ACTUAL DATA \</body\> | |
| (3) CASE TO LINK TO A REGISTRATION DESTINATION URL IN ADDITION TO CASE (2) | \<header\> POSITION-INTERRELATED CONDITION META DEFINITION \</header\> \<body\> URL ADDRESS \</body\> | \<header\> ... \</header\> \<body\> URL ADDRESS \</body\> | \<header\> ... \</header\> \<body\> ACTUAL DATA \</body\> |

FIG. 7

| | CACHED DATA |
|---|---|
| (1) CASE TO REGISTER ALL DATA IN POSITION-INTERRELATED HTML REGISTRATION SERVER | <header><br>POSITION-INTERRELATED CONDITION META DEFINITION<br></header><br><body><br>ACTUAL DATA<br></body> |
| (2) CASE TO SPECIFY A REGISTRATION DESTINATION URL TO POSITION-INTERRELATED HTML REGISTRATION SERVER. | <header><br>POSITION-INTERRELATED CONDITION META DEFINITION<br></header><br><body><br>URL ADDRESS<br></body>  →  <header><br>...<br></header><br><body><br>ACTUAL DATA<br></body> |
| (3) CASE TO LINK TO A REGISTRATION DESTINATION URL IN ADDITION TO CASE (2) | <header><br>POSITION-INTERRELATED CONDITION META DEFINITION<br></header><br><body><br>URL ADDRESS<br></body>  →  <header><br>...<br></header><br><body><br>URL ADDRESS<br></body>  →  <header><br>...<br></header><br><body><br>ACTUAL DATA<br></body> |

INFORMATION PROVISION SYSTEM

CROSS REFERENCE TO RELATED APPLICATIONS

This application is a U.S. National Phase Application under 35 U.S.C. 371 of International Application No. PCT/JP2013/001888 filed on Mar. 20, 2013 and published in Japanese as WO 2013/145643 A1 on Oct. 3, 2013. This application is based on and claims the benefit of priority from Japanese Patent Application No. 2012-073845 filed on Mar. 28, 2012. The entire disclosures of all of the above applications are incorporated herein by reference.

TECHNICAL FIELD

The present disclosure relates to an information provision system including a vehicular mobile terminal mounted on a vehicle and a server that accesses a registration database storing web pages registered in response to requests from terminals including the vehicular mobile terminal and provides the vehicular mobile terminal with contents registered in the registration database.

BACKGROUND ART

An apparatus of the related art (e.g., see patent literature 1) supplies personalized information from a service provider to users who use mobile terminals. Based on request information from a mobile terminal containing an HTML browser, the apparatus searches a subscriber and content database for requested contents and allows a server to supply the search result to the mobile terminal.

Some vehicular mobile terminals such as vehicle navigation systems are capable of accessing a networked registration server using an HTML browser and displaying a web page registered in the registration server.

Web pages registered in the above-mentioned registration server are written in the data description language such as general-purpose HTML (Hyper Text Markup Language). Basically, consistent contents are supplied to any access-allowed terminals anytime and anywhere.

A user performs condition input manipulation such as entering a search condition, selecting an icon, and specifying an URL according to instructions from the browser displayed on a terminal screen. The user can thereby acquire necessary information anytime and anywhere.

However, the user needs to perform manipulation to input various conditions according to instructions from the browser displayed on the terminal screen if consistent contents are supplied to any terminals anytime and anywhere as described above. For example, the condition input manipulation on a vehicular mobile terminal mounted on the vehicle may interrupt driving manipulation while the user drives the vehicle. This is inconvenient from the viewpoint of safety.

To solve this problem, it is considered effective to provide a service that uses a vehicle's moving state as condition input depending on the travel of a vehicle mounted with the mobile terminal and provides various contents at appropriate timings according to vehicle's moving states.

However, such a service aims at reducing user's manipulations and is favorably limited to the vehicular mobile terminal mounted on the vehicle. Terminals other than the vehicular mobile terminal are favorably provided with contents according to the user's manipulation to input conditions.

PRIOR ART LITERATURES

Patent Literature

[Patent Literature 1]
JP-A-2005-521299

SUMMARY OF INVENTION

It is an object of the present disclosure to provide an information provision system including a vehicular mobile terminal mounted on a vehicle and a server that accesses a registration database storing web pages registered in response to requests from terminals including the vehicular mobile terminal and provides the vehicular mobile terminal with contents registered in the registration database. More specifically, the disclosure relates to providing a terminal accessing a web page with contents according to user's manipulation to input conditions and providing a vehicular mobile terminal with contents according to vehicle's moving states at proper timing without needing for user's manipulation to input conditions.

According to an aspect of the present disclosure, an information provision system includes: a vehicular mobile terminal mounted on a vehicle; and a server that accesses a registration database, which registers a web page, in response to a request from at least one terminal including the vehicular mobile terminal, and provides a content registered in the registration database to the vehicular mobile terminal. The vehicular mobile terminal includes a current position specification device that specifies a current position. The registration database registers a position-interrelated content provision web page that: specifies the content to be provided to each of accessing terminals as an object according to an input condition from the accessing terminals; and defines a position-interrelated content to be provided on the web page when the vehicular mobile terminal satisfies at least one of trigger conditions for the vehicular mobile terminal, the trigger conditions including a condition for moving from one specific link to another specific link, a condition for moving from a specific link to a specific point, and a condition for moving from a specific link to a specific area. The information provision system further includes: a position-interrelated content search device that: specifies a moving state of the vehicular mobile terminal based on the current position specified by the current position specification device; and searches the registration database for the position-interrelated content corresponding to a same trigger condition as the moving state of the vehicular mobile terminal, when the vehicular mobile terminal accesses the position-interrelated content provision web page and the position-interrelated content provision web page defines the position-interrelated content for the vehicular mobile terminal; and an information provision device that provides a user of the vehicular mobile terminal with the position-interrelated content searched by the position-interrelated content search device when the trigger condition specified in the position-interrelated content is satisfied.

According to this configuration, the vehicular mobile terminal includes a current position specification means. The registration database registers a position-interrelated content provision web page that specifies a content to be provided according to an input condition from each of accessing terminals and defines a position-interrelated content to be provided when the vehicular mobile terminal satisfies at least one of trigger conditions for the vehicular mobile terminal such as moving from one specific link to another, moving from a specific link to a specific point, and moving from a specific link to a specific area. The system specifies a moving state of the vehicular mobile terminal based on a current position specified by the current position specification means and searches the registration database for the position-interrelated content corresponding to the same trigger condition as the moving state of the vehicular mobile terminal when the vehicular mobile terminal accesses the position-interrelated content provision web page and the system determines that the position-interrelated content provision web defines the position-interrelated content for the vehicular mobile terminal. The vehicular mobile terminal provides its user with the retrieved position-interrelated content according to the trigger condition specified in the database. That is, the system can provide a terminal accessing the web page with a content corresponding to user's manipulation to input conditions. The system can also provide the vehicular mobile terminal with a content corresponding to the vehicle's moving state at a proper timing without needing for user's manipulation to input conditions.

BRIEF DESCRIPTION OF DRAWINGS

The above and other objects, features and advantages of the present disclosure will become more apparent from the following detailed description made with reference to the accompanying drawings. In the drawings:

FIG. 2 illustrates a block configuration of a vehicular mobile terminal;

FIG. 3 illustrates trigger conditions in a position-interrelated database;

FIG. 4 illustrates position-interrelated condition meta definition;

FIG. 7 illustrates position-interrelated database caching.

EMBODIMENTS FOR CARRYING OUT INVENTION

Figure 1:
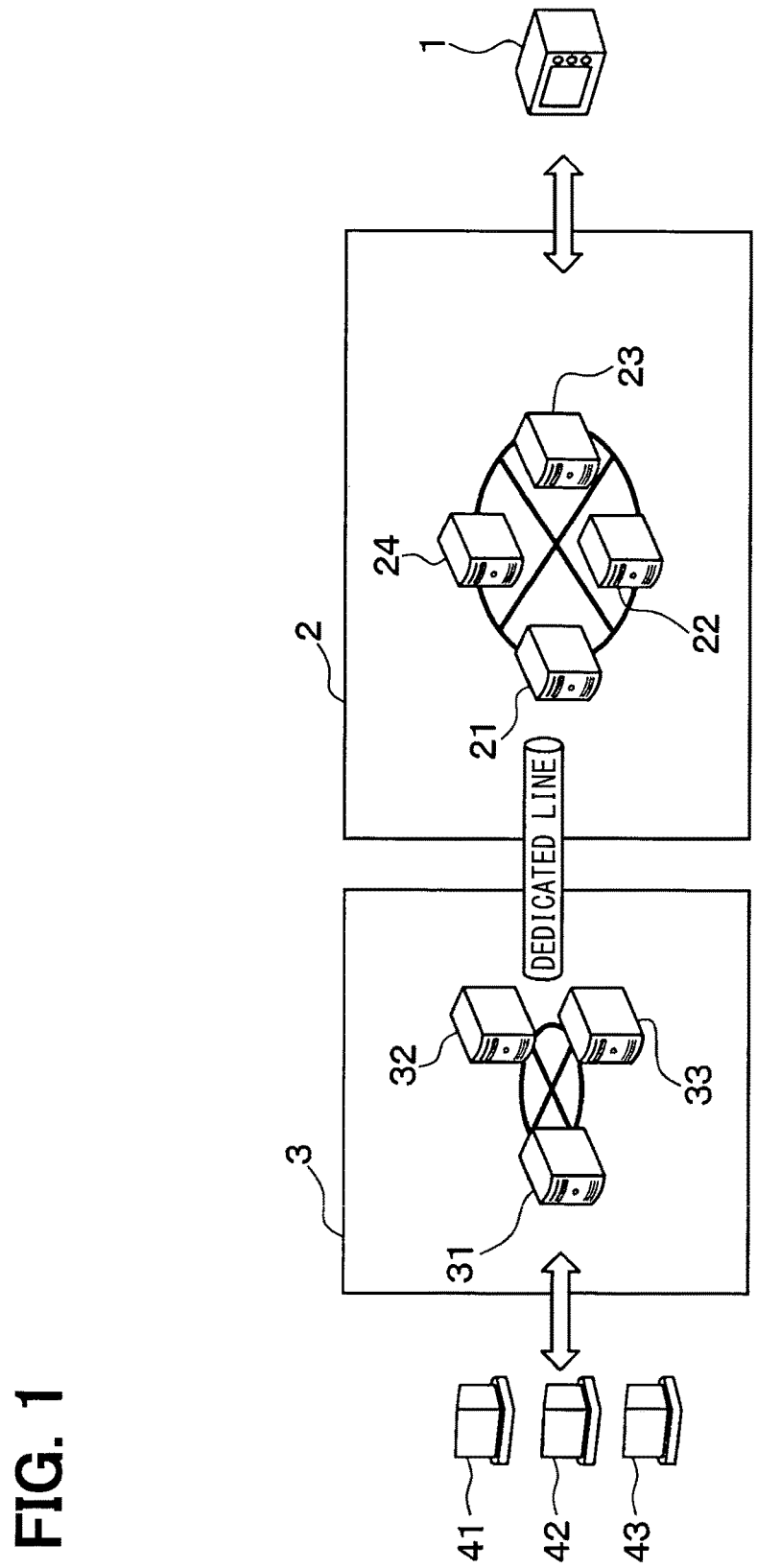
FIG. 1 illustrates an overall configuration of an information provision system according to an embodiment.

FIG. 1 illustrates an overall configuration of an information provision system according to an embodiment. The information provision system includes a vehicular mobile terminal 1 mounted on a vehicle, servers 21 through 24 installed in a distribution center 2, and servers 31 through 33 installed in a registration center 3. Terminals other than the vehicular mobile terminal 1 are also capable of accessing the servers 21 through 24 installed in the distribution center 2 and the servers 31 through 33 installed in the registration center 3.

The vehicular mobile terminal 1 according to the embodiment is configured as a navigation system mounted near an instrument panel of the vehicle. A driver can manipulate the vehicular mobile terminal 1 while sitting on a driver's seat.

As illustrated in FIG. 2, the vehicular mobile terminal 1 includes a GPS reception portion 10 to receive a positioning signal from a GPS satellite, a map data storage portion 11 to store map data, a communication portion 12 for wireless communication, a manipulation portion 13, a display portion 14 to display video on a liquid crystal display, an audio output portion 15 to output audio, and a control portion 16. The manipulation portion 13 includes a switch and outputs a signal corresponding to manipulation of the switch.

The control portion 16 is configured as a computer including a CPU, memory, and an I/O device. The CPU performs various processes according to a program stored in the memory. The vehicular mobile terminal 1 is installed with application software such as a browser to display web pages and map software to display a map in the vicinity of the current position or provide route guidance.

The control portion 16 performs a current position specification process, a map display process, and a web display process, for example. The current position specification process specifies a current position based on a positioning signal received by the GPS reception portion 10 from a GPS satellite. The map display process displays a current position mark to overlap on a map in the vicinity of the current position based on map data stored in the map data storage portion 11. The web display process connects to a network communication network via the communication portion 12 and allows the display portion 14 to display images in a web site specified by the user manipulation.

The distribution center 2 is installed with a position-interrelated HTML database 21, a user management server 22, a mobile terminal UI server 23, and a center search server 24. The servers 21 through 24 are connected to each other via the network communication network.

The registration center 3 is installed with a registration UI server 31, a position-interrelated HTML registration server 32, and an examination server 33. The servers 31 through 33 are also connected to each other via the network communication network.

The servers 31 through 33 installed in the registration center 3 are connected to the servers 21 through 24 installed in the distribution center 2 via a dedicated line.

The registration UI server 31 installed in the registration center 3 connects to a shop server 41 installed in a shop, a service provider server 42 to plan or manage a web site, and a content provider server 43 to deliver music or video.

The shop server 41, the service provider server 42, and the content provider server 43 can allow the registration UI server 31 installed in the registration center 3 to register web pages or contents for a home page in servers such as the position-interrelated HTML registration server 32.

The registration UI server 31 authenticates a user who registers a web page or content to the position-interrelated HTML registration server 32. The registration UI server 31 also manages user information.

The position-interrelated HTML registration server 32 registers a web page written in the general-purpose HTML (Hyper Text Markup Language).

The position-interrelated HTML registration server 32 registers various web pages to provide contents according to condition input manipulation such as entering a search condition, selecting an icon, or specifying a URL.

The examination server 33 examines based on predetermined examination criteria whether a web page registered to the position-interrelated HTML registration server 32 is appropriately provided to the vehicular mobile terminal 1 attached to the vehicle.

For example, the examination criteria include: limiting the number of characters displayed per screen to a predetermined value or smaller; not containing video displayed to attract the driver's view for a predetermined time or longer; not containing an image whose brightness exceeds a predetermined value; not containing an image whose content is unrecognizable without driver's attention for a predetermined time or longer; not containing an image that allows the driver to misunderstand the driving guidance; not containing a music content whose volume exceeds a predetermined value for reproduction; and not simultaneously providing position-interrelated contents the number of which exceeds a predetermined value.

The position-interrelated HTML database 21 at the distribution center 2 stores only a web page that passes the examination by the examination server 33.

The user management server 22 manages user information about the vehicular mobile terminal 1. The user management server 22 enables to provide contents to each vehicular mobile terminal 1. The user information contains attributes (e.g., gender and age) of a user who owns the vehicular mobile terminal 1.

The mobile terminal UI server 23 authenticates the user of the vehicular mobile terminal 1 and limits accesses. The mobile terminal UI server 23 also authenticates users and limits accesses from terminals other than the vehicular mobile terminal 1.

The center search server 24 specifies a link to position the vehicular mobile terminal 1 based on the current position of the vehicular mobile terminal 1.

According to the embodiment, at least one of the position-interrelated HTML registration server 32 and the position-interrelated HTML database 21 registers a position-interrelated content provision web page.

The position-interrelated content provision web page provides contents according to condition input manipulation such as entering a search condition, selecting an icon, or specifying a URL in response to requests from terminals other than the vehicular mobile terminal 1 such as a personal computer, a multi-functional mobile telephone, and a tablet terminal. The position-interrelated content provision web page to be registered provides the vehicular mobile terminal 1 with various contents at proper timings according to vehicle moving states depending on the travel of a vehicle mounted with the vehicular mobile terminal 1.

FIG. 3 illustrates trigger conditions, namely, movement from a specific link to another specific link (link-to-link), movement from a specific link to a specific point (link-to-point), and movement from a specific link to a specific area (link-to-area). The position-interrelated content provision web page defines position-interrelated condition meta information that specifies a position-interrelated content to be provided when the vehicular mobile terminal 1 satisfies a trigger condition.

The link-to-link trigger condition specifies a content provided for only a mobile body that travels a route from a given link to another link. If a link branches to multiple links, the trigger condition can specify a content provided for each of the branch links. The trigger condition can also specify a content provided for three or more consecutive links. The trigger condition can specify a timing to provide the content.

The link-to-point trigger condition specifies a content provided for only a mobile body that passes through a given link and approaches a given point. The trigger condition can specify a timing to provide the content.

The link-to-area trigger condition specifies a content provided for only a mobile body that enters a given area from a given link or enters a given link from a given area. According to the embodiment, the trigger condition may contain an option, namely, an information provision point indicating the detail of a point that provides a position-interrelated content. For example, the information provision point may represent 100 meters backward of a branch point from link A to link B or 300 meters backward of an entry point from link A to specific area C.

According to the embodiment, the trigger condition may contain at least one of a temporal condition (e.g., the number of consecutive hours or a period), a user attribute (e.g., gender or age), weather information, and traffic congestion information as an option. These options may be defined as meta information of the position-interrelated content provision web page.

An extended attribute of the position-interrelated content provision web page defines the above-mentioned position-interrelated database.

FIG. 4 illustrates examples of the position-interrelated condition meta definition. They represent: (1) storing the position-interrelated database in the position-interrelated HTML registration server 32; (2) specifying URL of a service provider server (SP server) or a content provider server (CP server) that stores the position-interrelated database; and (3) allowing a service provider server (SP server) or a content provider server (CP server) to specify URL of a referenced service provider server (SP server) or a referenced content provider server (CP server) that stores the position-interrelated database.

An HTML document uses three tags <html>, <header>, and <body> to define the document structure. Though not shown in FIG. 4, the <html> tag declares an HTML document and is described at the beginning and the end of the document. Header information such as a document title is described between <header> and </header>. A document body actually displayed in the browser is described between <body> and </body>.

The header information described between <header> and </header> includes a document title, a style sheet, and a script and is generally not displayed on the screen. The HTML browser uses the header information to process the HTML. The header also contains the meta definition that enables the extended definition.

According to the embodiment, the meta tag is used in the header of the position-interrelated content provision web page to define the position-interrelated database.

Example (1) in FIG. 4 stores all data in the position-interrelated HTML registration server 32. In this case, the <body> tag in the position-interrelated content provision web page specifies actual data for the position-interrelated database.

Example (2) in FIG. 4 specifies URL of the service provider server (SP server) or the content provider server (CP server) that stores the position-interrelated database. In this case, the <body> tag in the position-interrelated content provision web page specifies URL of the server that stores the position-interrelated database.

Example (3) in FIG. 4 allows the service provider server (SP server) or the content provider server (CP server) to specify URL of a referenced service provider server (SP server) or a referenced content provider server (CP server) that stores the position-interrelated database. In this case, the <body> tag in the position-interrelated content provision web page specifies URL of the service provider server (SP server) that specifies URL of the referenced service provider server (SP server) to store the position-interrelated database.

When the user manipulation activates the browser and the vehicular mobile terminal 1 according to the embodiment allows the mobile terminal UI server 23 to access the user management server 22, the center search server 24, the position-interrelated HTML registration server 32, or the position-interrelated HTML database 21 that registers the position-interrelated content provision web page. When the vehicular mobile terminal 1 successfully accesses the position-interrelated HTML database 21 that registers the position-interrelated content provision web page, the vehicular mobile terminal 1 periodically transmits its identification information and the current position specified based on a positioning signal received by the GPS reception portion 10 from the GPS satellite to the mobile terminal UI server 23, the user management server 22, or the center search server 24. The vehicular mobile terminal 1 also performs processes corresponding to contents provided from the servers.

The server process will be described with reference to FIG. 5. The following description assumes the servers 21 through 24 installed in the distribution center 2 and the servers 31 through 33 installed in the registration center 3 to be a single server to perform the server process.

When the server determines that a terminal other than the vehicular mobile terminal 1 accesses the position-interrelated content provision web page, the server then provides a content corresponding to an input condition from the terminal other than the vehicular mobile terminal 1. For example, the server performs a search process using a search condition, namely, a keyword input to a console box displayed on the display screen. When an icon displayed on the display screen is selected, the server performs a process to display a web page linked with the selected icon.

Figure 5:
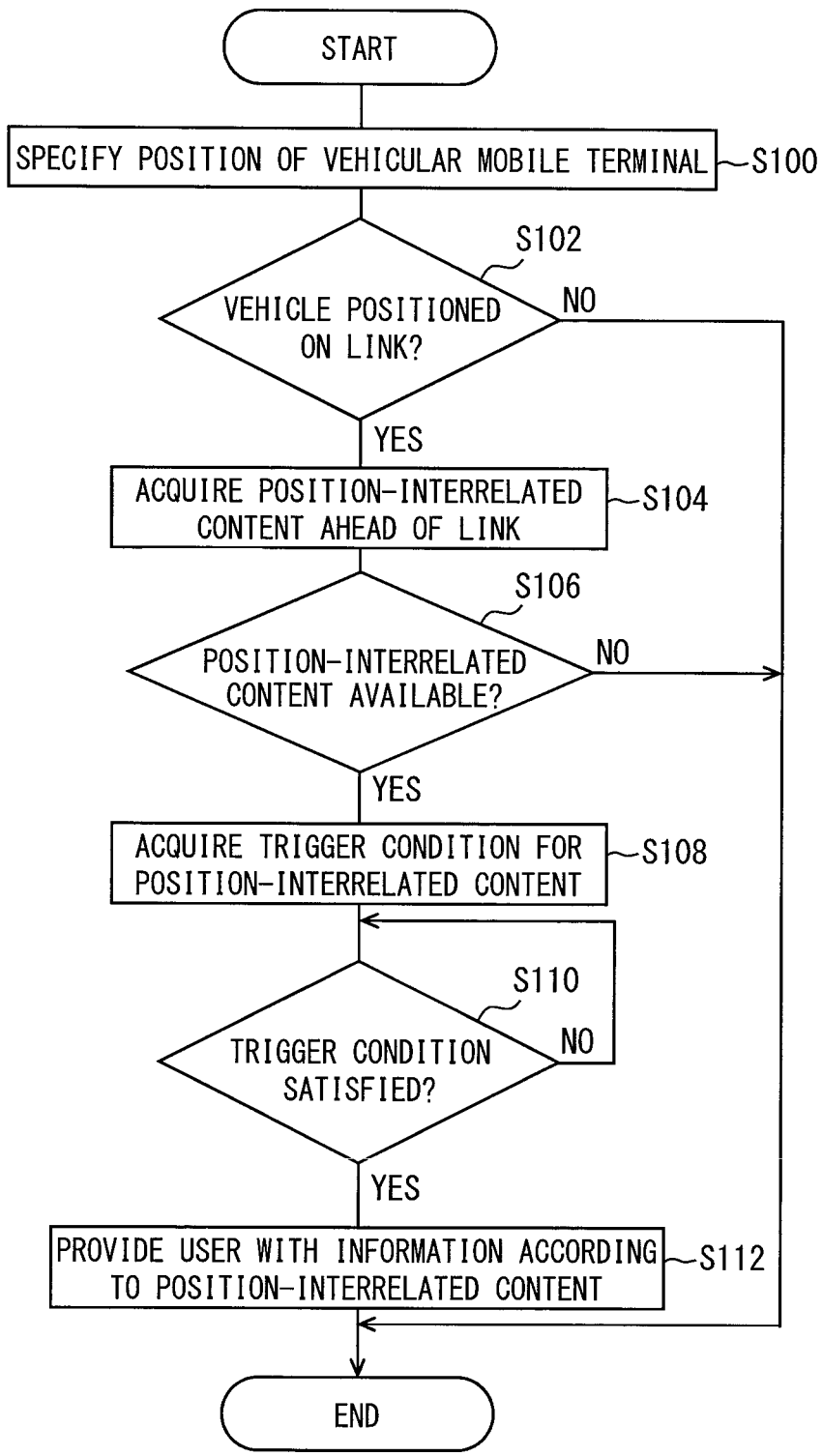
FIG. 5 is a flowchart illustrating a server process.

The server periodically performs the process illustrated in FIG. 5, when determining that the vehicular mobile terminal 1 accesses the position-interrelated content provision web page and the position-interrelated content provision web page defines a position-interrelated database for the vehicular mobile terminal 1.

The server specifies the vehicular mobile terminal 1 based on identification information transmitted from the vehicular mobile terminal 1 and specifies a position of the vehicular mobile terminal 1 based on information indicating the current position periodically transmitted from the vehicular mobile terminal 1 (S100).

The server determines whether a vehicle mounted with the vehicular mobile terminal 1 is positioned on a link (S102). The map matching technology that corrects the current position to a position on a road can be used to determine whether a vehicle mounted with the vehicular mobile terminal 1 is positioned on a link.

The determination at S102 results in NO if the vehicle mounted with the vehicular mobile terminal 1 is not positioned on the link. The server then terminates the process. The determination at S102 results in YES if the vehicle mounted with the vehicular mobile terminal 1 is positioned on the link. The server then acquires a position-interrelated content forward of the link where the vehicle mounted with the vehicular mobile terminal 1 is positioned (S104). Specifically, the server acquires the position-interrelated content contained in a predetermined area forward of the vehicle mounted with the vehicular mobile terminal 1 from the position-interrelated database.

The server specifies a moving state of the vehicular mobile terminal 1 and searches the registration database for a position-interrelated content that may satisfy the same trigger condition as the moving state of the vehicular mobile terminal 1. The server determines whether to retrieve a position-interrelated content that may satisfy the same trigger condition as the moving state of the vehicular mobile terminal 1 (S106). According to the embodiment, the server searches for a position-interrelated content from the current position of the vehicular mobile terminal 1 to a moving destination thereof. According to the embodiment, the server uses an information provision point as a narrowing condition to search for a position-interrelated content. The information provision point is used to specify in detail a point to provide the position-interrelated content. The server specifies a current temporal condition and uses the temporal condition as a narrowing condition to search for a position-interrelated content. The server acquires a user attribute of the vehicular mobile terminal and uses the user attribute as a narrowing condition to search for a position-interrelated content. The server acquires weather information in the vicinity of the current position of the vehicular mobile terminal and uses the weather specified by the weather information in the vicinity of the vehicular mobile terminal as a narrowing condition to search for a position-interrelated content. The server acquires traffic congestion information in the vicinity of the current position of the vehicular mobile terminal and uses the traffic congestion state specified by the traffic congestion information in the vicinity of the vehicular mobile terminal as a narrowing condition to search for a position-interrelated content.

The determination at S106 results in NO if the server does not retrieve a position-interrelated content that may satisfy the same trigger condition as the moving state of the vehicular mobile terminal 1. The server then terminates the process. The determination at S106 results in YES if the server retrieves a position-interrelated content that may satisfy the same trigger condition as the moving state of the vehicular mobile terminal 1. The server then acquires a trigger condition for the retrieved position-interrelated content (S108).

The server determines whether the trigger condition is satisfied (S110). Specifically, the server determines whether the moving state of the vehicular mobile terminal 1 matches the trigger condition for the retrieved position-interrelated content.

The determination at S110 results in NO if the moving state of the vehicular mobile terminal 1 does not match the trigger condition for the retrieved position-interrelated content. The server repeats the determination at S110. The determination at S110 results in YES if the moving state of the vehicular mobile terminal 1 matches the trigger condition for the retrieved position-interrelated content. The server transmits the position-interrelated content to the vehicular mobile terminal 1 (S112) and terminates the process.

When receiving the position-interrelated content, the vehicular mobile terminal 1 performs a process corresponding to the received position-interrelated content.

As an example process corresponding to the position-interrelated content, suppose the vehicular mobile terminal 1 is mounted on the vehicle that has moved or is going to move from a specific link backward of a shop to another specific link. The server delivers a coupon or provides the guidance about the shop for that vehicular mobile terminal 1 at a point backward of the shop.

If the vehicle moves from a specific link to a specific area, the server may provide the vehicular mobile terminal 1 mounted on the vehicle with the guidance about an event to be held in the area.

The server may deliver a special coupon to a customer who visits the shop at a rainy day. The server may provide the guidance about a rest spot for the vehicular mobile terminal 1 mounted on the vehicle that moves from a link subject to the traffic congestion to another link.

The search condition may additionally include the user attribute (e.g., gender or age) contained in the user information managed by the user management server 22. The server can deliver coupons to female customers only, for example.

Based on the moving state of the vehicular mobile terminal 1, when the server determines the elapse of a short period of time after the vehicle mounted with the vehicular mobile terminal 1 starts running, the server can stop providing the guidance about a rest spot.

When the vehicle mounted with the vehicular mobile terminal 1 moves from link A to point P, the server can provide the guidance about a rest spot immediately backward of point P if traffic congestion occurs on link A. The server can provide the guidance about a rest spot distantly backward of point P if no traffic congestion occurs on link A.

The vehicular mobile terminal 1 may enter an incommunicable area where no telecommunications infrastructure is improved. In such a case, the server cannot provide the vehicular mobile terminal 1 with the above-mentioned position-interrelated contents.

To solve this problem, there is provided a table that specifies incommunicable areas that make the vehicular mobile terminal 1 incommunicable. Based on this table, the server according to the embodiment determines whether the vehicular mobile terminal 1 is likely to move to an incommunicable area. If it is determined that the vehicular mobile terminal 1 is likely to move to an incommunicable area, the server performs a process to transmit a position-interrelated content contained in the incommunicable area to the vehicular mobile terminal before the vehicular mobile terminal 1 moves to the incommunicable area.

Figure 6:
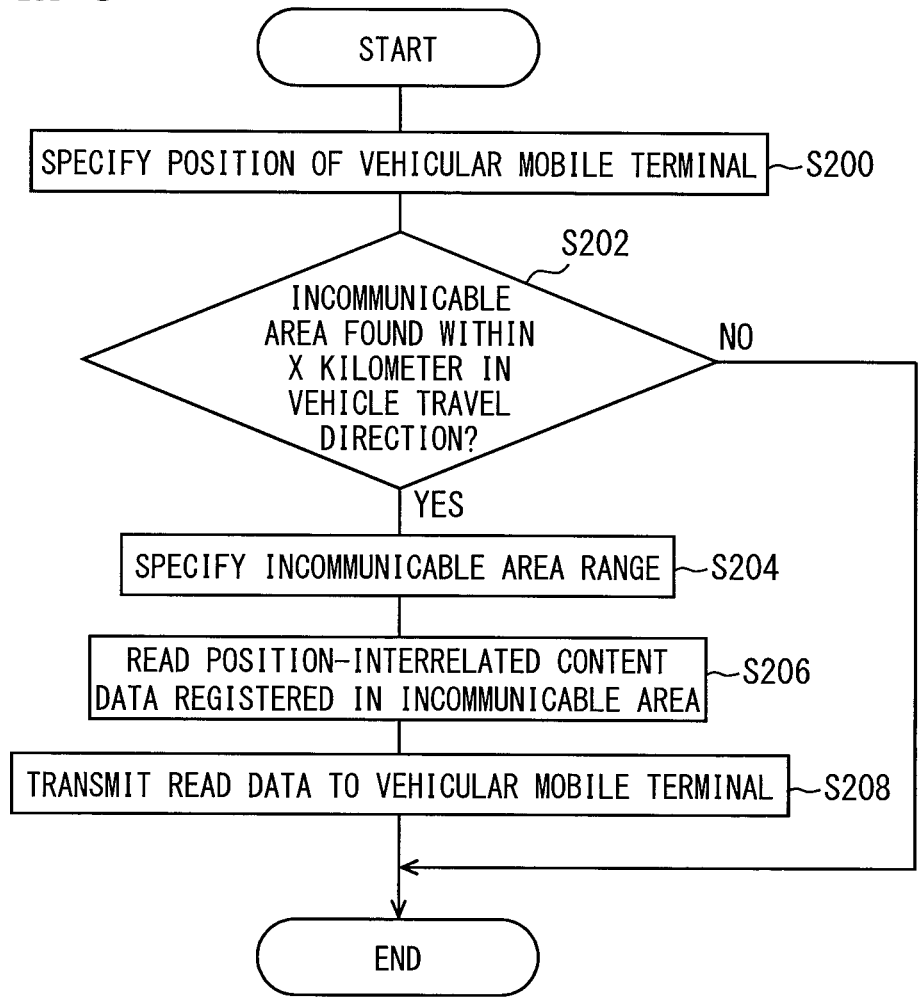
FIG. 6 is a flowchart illustrating a server process performed when a vehicular mobile terminal accesses a web page providing position-interrelated contents.

This process will be described with reference to FIG. 6. The server according to the embodiment performs the process illustrated in FIG. 6 in parallel with the process illustrated in FIG. 5.

The server specifies the vehicular mobile terminal 1 based on identification information transmitted from the vehicular mobile terminal 1 and specifies a position of the vehicular mobile terminal 1 based on the information indicating the current position periodically transmitted from the vehicular mobile terminal 1 (S200).

Based on a table that specifies incommunicable areas that make the vehicular mobile terminal 1 incommunicable, the server determines whether an incommunicable area exists within X kilometers (km) in the vehicle travel direction (S202).

The server terminates the process if no incommunicable area exists within X kilometers (km) in the vehicle travel direction. The determination at S202 results in YES if an incommunicable area exists within X kilometers (km) in the vehicle travel direction. The server specifies an incommunicable area range based on the table that specifies incommunicable areas that make the vehicular mobile terminal 1 incommunicable (S204).

The server reads position-interrelated content data registered to the incommunicable area (S206). The position-interrelated database is not always stored in the same server as that stores the position-interrelated content provision web page. For this reason, the server caches position-interrelated content data registered to the incommunicable area including data corresponding to the link destination for the position-interrelated content provision web page as illustrated in FIG. 7.

The server transmits the read position-interrelated content data to the vehicular mobile terminal 1 (S208) and terminates the process.

When receiving the position-interrelated content data transmitted from the server, the vehicular mobile terminal 1 temporarily stores the received position-interrelated content data in the memory. When the vehicle mounted with the vehicular mobile terminal 1 enters an incommunicable area, the vehicular mobile terminal 1 reads the position-interrelated content data from the memory and provides the position-interrelated content. Specifically, the vehicular mobile terminal 1 references the position-interrelated content data temporarily stored in the memory to retrieve the position-interrelated content corresponding to the same trigger condition as the moving state of the vehicular mobile terminal. The vehicular mobile terminal 1 provides the vehicular mobile terminal's user with the retrieved position-interrelated content according to the trigger condition specified in the database.

According to the above-mentioned configuration, the registration database (e.g., position-interrelated HTML database 21) registers a position-interrelated content provision web page. The position-interrelated content provision web page specifies contents to be provided according to input conditions from each of the accessing terminals. The trigger condition is specified as at least one of vehicular mobile terminal states, namely, moving from one specific link to another, moving from a specific link to a specific point, and moving from a specific link to a specific area. The position-interrelated content provision web page also defines a position-interrelated content to be provided when the vehicular mobile terminal satisfies the trigger condition. The vehicular mobile terminal performs the process to specify the current position. When the server determines that the vehicular mobile terminal accesses a position-interrelated content provision web page and that the position-interrelated content provision web page defines a position-interrelated database targeted for the vehicular mobile terminal, the server specifies the moving state of the vehicular mobile terminal based on the vehicular mobile terminal's current position. The server references the registration database to retrieve a position-interrelated content corresponding to the same trigger condition as the moving state of the vehicular mobile terminal. The retrieved position-interrelated content is provided for the vehicular mobile terminal user according to the trigger condition specified in the position-interrelated content. That is, the server can provide a terminal accessing the web page with a content corresponding to user's manipulation to input conditions. The server can also provide the vehicular mobile terminal with a content corresponding to the vehicle's moving state at a proper timing without needing for user's manipulation to input conditions. The vehicular mobile terminal user can be provided with the content corresponding to an input condition while accessing the position-interrelated content provision web page. The vehicular mobile terminal user can be provided with a position-interrelated content appropriate to the moving state of the vehicular mobile terminal without manipulating the vehicular mobile terminal. A user of a terminal other than the vehicular mobile terminal can be provided with the content corresponding to an input condition.

The position-interrelated content provision web page is described in HTML. A position-interrelated content can be defined as meta information for the position-interrelated content provision web page.

The server searches for a position-interrelated content from the current position of the vehicular mobile terminal to the travel destination thereof. The server can thereby provide predetermined position-interrelated contents in the order of adjacencies from the vehicular mobile terminal.

The server determines a possibility of the vehicular mobile terminal's moving to an incommunicable area based on the table that specifies incommunicable areas that make the vehicular mobile terminal incommunicable. If it is determined that the vehicular mobile terminal moves to an incommunicable area, the server transmits a position-interrelated content contained in the incommunicable area to the vehicular mobile terminal before the vehicular mobile terminal moves to the incommunicable area. The vehicular mobile terminal acquires the position-interrelated content before moving to the incommunicable area. The server can provide position-interrelated contents even after the vehicular mobile terminal enters the incommunicable area.

For example, the above-mentioned embodiment has described the example of configuring the vehicular mobile terminal 1 using the navigation system, but is not limited to the navigation system. The vehicular mobile terminal 1 may be configured by using a tablet terminal, a multi-functional mobile telephone (smartphone), or a personal digital assistance (PDA) that can be attached near a driver's seat of a vehicle using an attachment member.

In the above-mentioned example according to the embodiment, the server searches for a position-interrelated content having the same trigger condition as the moving state of the vehicular mobile terminal and provides the vehicular mobile terminal user with the searched position-interrelated content according to the trigger condition. Alternatively, the vehicular mobile terminal 1 may issue an instruction that allows the server to search for a position-interrelated content having the same trigger condition as the moving state of the vehicular mobile terminal. In response to this instruction, the server may perform the search and transmit the searched position-interrelated content to the vehicular mobile terminal 1. The vehicular mobile terminal 1 may receive the searched position-interrelated content and may provide the user with the position-interrelated content according to the trigger condition specified in the position-interrelated database.

The above-mentioned embodiment has described the example of using HTML as the data description rule. Alternatively, the data description rule may use other markup languages (e.g., XML and HTML5) to be widely used in the future.

The current position specification process allows the vehicular mobile terminal 1 to specify the current position based on a measuring signal received by the GPS reception portion 10 from a GPS satellite and corresponds to a current position specification device. The S106 corresponds to a position-interrelated content search device. The S112 corresponds to an information provision device. The memory of the vehicular mobile terminal corresponds to a storage device. The S202 corresponds to an incommunicable area movement determination device. The S208 corresponds to a transmission device.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:
1. An information provision system comprising:
a vehicular mobile terminal mounted on a vehicle; and
a server that accesses a registration database, which registers a web page, in response to a request from at least one terminal including the vehicular mobile terminal, and provides a content registered in the registration database to a user of the at least one terminal,
wherein the vehicular mobile terminal includes a current position specification device that specifies a current position, and
wherein the registration database registers a position-interrelated content provision web page that: specifies the content to be provided to each of accessing terminals as an object according to an input condition from the accessing terminals; and defines a position-interrelated content to be provided on the web page when the vehicular mobile terminal satisfies at least one of trigger conditions for the vehicular mobile terminal, the trigger conditions including a condition for moving from one specific link to another specific link,
the information provision system further comprising:
a position-interrelated content search device that: specifies a moving state of the vehicular mobile terminal based on the current position specified by the current position specification device; and searches the registration database for the position-interrelated content corresponding to a same trigger condition as the moving state of the vehicular mobile terminal, when the vehicular mobile terminal accesses the position-interrelated content provision web page and the position-interrelated content provision web page defines the position-interrelated content for the vehicular mobile terminal; and
an information provision device that provides the user of the vehicular mobile terminal with the position-interrelated content searched by the position-interrelated content search device when the trigger condition specified in the position-interrelated content is satisfied,
wherein, when the at least one terminal other than the vehicular mobile terminal accesses the position-interrelated content provision web page, the server provides the content according to an input condition from the at least one terminal other than the vehicular mobile terminal,
wherein, when the vehicular mobile terminal accesses the position-interrelated content provision web page, and the position-interrelated content provision web page defines the position-interrelated content for the vehicular mobile terminal, the server searches the position-interrelated content, and provides the position-interrelated content to the user of the vehicular mobile terminal, without user input,
wherein the position-interrelated content provided to the user of the vehicular mobile terminal is different from the content according to the input condition from the at least one terminal other than the vehicular mobile terminal,
wherein the server includes an examination server that determines whether the position-interrelated content provision web page meets predetermined examination criteria,
wherein the registration database registers only the position-interrelated content provision web page that meets the predetermined examination criteria, and
wherein the examination criteria includes: limiting a numerical number of characters displayed per screen to a predetermined value or smaller; not containing video displayed to attract a driver's view for a predetermined time or longer; not containing an image whose brightness exceeds a predetermined value; not containing an image whose content is unrecognizable without driver's attention for a predetermined time or longer; not containing an image that allows the driver to misunderstand a driving guidance; not containing a music content whose volume exceeds a predetermined value for reproduction; and not simultaneously providing position-interrelated contents, a numerical number of which exceeds a predetermined value.

2. The information provision system according to claim 1, wherein the position-interrelated content provision web page is described in Hyper Text Markup Language, and wherein the position-interrelated content is defined as meta information about the position-interrelated content provision web page.

3. The information provision system according to claim 1, wherein the position-interrelated content search device searches for the position-interrelated content in an order of a distance from the vehicular mobile terminal toward a travel destination of the vehicular mobile terminal from the current position of the vehicular mobile terminal.

4. The information provision system according to claim 1, wherein the vehicular mobile terminal acquires the position-interrelated content corresponding to a predetermined area disposed ahead of the vehicular mobile terminal in a travel direction, and controls a storage device to temporarily store an acquired position-interrelated content corresponding to the predetermined area disposed ahead of the vehicular mobile terminal, and wherein the position-interrelated content search device is arranged in the vehicular mobile terminal, and searches the position-interrelated content temporarily stored in the storage device for a position-interrelated content corresponding to the same trigger condition as the moving state of the vehicular mobile terminal.

5. The information provision system according to claim 1, wherein the server includes:

an incommunicable area movement determination device that determines a possibility whether the vehicular mobile terminal moves to the incommunicable area, based on a table that specifies the incommunicable area in which the vehicular mobile terminal is incommunicable; and a transmission device that transmits the position-interrelated content included in the incommunicable area to the vehicular mobile terminal before the vehicular mobile terminal moves to the incommunicable area when the incommunicable area movement determination device determines the possibility that the vehicular mobile terminal moves to the incommunicable area.

6. The information provision system according to claim 1, wherein the trigger condition includes at least one of an information provision point indicative of a detail of a point at which the position-interrelated content is provided, a time condition, a user attribute of the vehicular mobile terminal, a weather situation, and a traffic congestion situation.

7. The information provision system according to claim 1, wherein the position-interrelated content search device searches for the position-interrelated content by adding an information provision point to specify a point, at which the position-interrelated content is provided, into a narrowing condition.

8. The information provision system according to claim 1, wherein the position-interrelated content search device specifies a current time condition and searches for the position-interrelated content by adding the current time condition into a narrowing condition.

9. The information provision system according to claim 1, wherein the position-interrelated content search device acquires a user attribute of the vehicular mobile terminal and searches for the position-interrelated content by adding the user attribute into a narrowing condition.

10. The information provision system according to claim 1, wherein the position-interrelated content search device acquires weather information around the current position of the vehicular mobile terminal and searches for the position-interrelated content by adding the weather information around the vehicular mobile terminal specified in the weather information into a narrowing condition.

11. The information provision system according to claim 1, wherein the position-interrelated content search device acquires traffic congestion information around the current position of the vehicular mobile terminal and searches for the position-interrelated content by adding the traffic congestion information around the vehicular mobile terminal specified in the traffic congestion information into a narrowing condition.

12. The information provision system according to claim 1, wherein the condition for moving from one specific link to another specific link specifies content to provide to the vehicular mobile terminal when the vehicular mobile terminal travels on a route having a first link and a second link and travels from the first link of the route to the second link of the route.

13. The information provision system according to claim 1, wherein the condition for moving from one specific link to another specific link specifies: first content to provide to the vehicular mobile terminal when the vehicular mobile terminal travels on a route having a first link that connects to a second link and a third link and the vehicular mobile terminal travels from the first link of the route to the second link of the route; and second content to provide to the vehicular mobile terminal when the vehicular mobile terminal travels on the route from the first link of the route to the third link of the route, the first content being different from the second content.

14. The information provision system according to claim 1, wherein the condition for moving from one specific link to another specific link specifies: first content to provide to the vehicular mobile terminal when the vehicular mobile terminal travels on a route having a first link connected to a second link, the second link being connected to a third link, and the vehicular mobile terminal travels from the first link of the route to the second link of the route; and second content to provide to the vehicular mobile terminal when the vehicular mobile terminal travels from the second link of the route to the third link of the route, the first content being different from the second content.

* * * * *